US009638846B2

(12) United States Patent
Parsons

(10) Patent No.: US 9,638,846 B2
(45) Date of Patent: May 2, 2017

(54) APPARATUS AND METHOD FOR MULTI-SPECTRAL DUAL BALANCED IMAGING

(75) Inventor: Robert Parsons, Vancouver (CA)

(73) Assignee: Power Diagnostic Technologies Ltd., New Westminster (CA)

(*) Notice: Subject to any disclaimer, the term of this patent is extended or adjusted under 35 U.S.C. 154(b) by 483 days.

(21) Appl. No.: 14/233,358

(22) PCT Filed: Jul. 12, 2012

(86) PCT No.: PCT/CA2012/050482
§ 371 (c)(1),
(2), (4) Date: Apr. 25, 2014

(87) PCT Pub. No.: WO2013/010272
PCT Pub. Date: Jan. 24, 2013

(65) Prior Publication Data
US 2014/0354873 A1 Dec. 4, 2014

Related U.S. Application Data

(60) Provisional application No. 61/509,982, filed on Jul. 20, 2011.

(51) Int. Cl.
G02B 5/26 (2006.01)
H04N 5/225 (2006.01)
(Continued)

(52) U.S. Cl.
CPC .............. *G02B 5/26* (2013.01); *G01J 3/0208* (2013.01); *G01J 3/0227* (2013.01); *G01J 3/36* (2013.01); *G02B 27/1013* (2013.01); *H04N 5/2254* (2013.01); *H04N 5/332* (2013.01); *H04N 5/3651* (2013.01)

(58) Field of Classification Search
CPC combination set(s) only.
See application file for complete search history.

(56) References Cited

U.S. PATENT DOCUMENTS 3,992,112 A 11/1976 Adrion
4,106,855 A 8/1978 Coon
(Continued)

FOREIGN PATENT DOCUMENTS

WO 2006022648 3/2006

*Primary Examiner* — Twyler Haskins
*Assistant Examiner* — Akshay Trehan
(74) *Attorney, Agent, or Firm* — Nexus Law Group LLP; Nicholas P. Toth

(57) ABSTRACT

An apparatus and method for multi-spectral dual balanced imaging is provided. The apparatus includes: (a) a first member operable to produce from incident light a first band having first band wavelengths and a second band; and (b) a second member operable to produce from the second band a third band having wavelengths shorter than the first band wavelengths, excluding the first band wavelengths and having wavelengths longer than the first band wavelengths. The method involves: (a) producing from incident light a first band having first band wavelengths and a second band; and (b) producing from the second band a third band having wavelengths shorter than the first band wavelengths, excluding the first band wavelengths and having wavelengths longer than the first band wavelengths.

20 Claims, 4 Drawing Sheets

(51) Int. Cl.
    *G02B 27/10*     (2006.01)
    *G01J 3/02*     (2006.01)
    *G01J 3/36*     (2006.01)
    *H04N 5/33*     (2006.01)
    *H04N 5/365*     (2011.01)

(56) References Cited

U.S. PATENT DOCUMENTS

| | | | |
|---|---|---|---|
| 4,520,265 A | | 5/1985 | Griggs et al. |
| 4,870,268 A | * | 9/1989 | Vincent .............. G02B 27/1006 |
| | | | 250/226 |
| 5,109,276 A | | 4/1992 | Nudelman et al. |
| 5,134,474 A | * | 7/1992 | Hanafusa .................. G01J 5/10 |
| | | | 250/332 |
| 5,258,618 A | | 11/1993 | Noble |
| 5,656,813 A | * | 8/1997 | Moore ............... G01N 21/3504 |
| | | | 250/330 |
| 5,708,504 A | | 1/1998 | Hopkins |
| 5,900,942 A | | 5/1999 | Spiering |
| 5,926,283 A | | 7/1999 | Hopkins |
| 5,982,497 A | * | 11/1999 | Hopkins ................... G01J 3/02 |
| | | | 250/226 |
| 6,061,141 A | | 5/2000 | Goldenberg et al. |
| 6,211,955 B1 | | 4/2001 | Basiji et al. |
| 6,212,014 B1 | | 4/2001 | Lehman, Jr. et al. |
| 6,217,695 B1 | | 4/2001 | Goldberg et al. |
| 6,459,490 B1 | | 10/2002 | Kuhn et al. |
| 6,473,176 B2 | * | 10/2002 | Basiji ..................... G01J 3/2803 |
| | | | 356/326 |
| 6,571,118 B1 | | 5/2003 | Utzinger et al. |
| 6,741,393 B1 | | 5/2004 | Neumann et al. |
| 6,853,452 B1 | * | 2/2005 | Laufer ............... G01N 21/3504 |
| | | | 356/436 |
| 7,053,928 B1 | | 5/2006 | Connors et al. |
| 7,189,970 B2 | | 3/2007 | Racca et al. |
| 7,265,350 B2 | | 9/2007 | Fauci et al. |
| 7,298,484 B2 | * | 11/2007 | Chen ..................... G02B 23/12 |
| | | | 348/E5.028 |
| 7,420,678 B2 | | 9/2008 | Lundgren et al. |
| 7,649,174 B2 | | 1/2010 | Mammen et al. |
| 7,687,776 B2 | | 3/2010 | Baliga et al. |
| 7,855,367 B2 | | 12/2010 | Tolton et al. |
| 7,977,639 B2 | | 7/2011 | Maillart et al. |
| 8,158,944 B2 | | 4/2012 | Tolton et al. |
| 8,193,496 B2 | | 6/2012 | Furry |
| 8,198,589 B2 | | 6/2012 | Tolton et al. |
| 8,264,689 B1 | * | 9/2012 | Azzazy ................ G01N 21/274 |
| | | | 356/437 |
| 8,319,880 B2 | | 11/2012 | Rockley |
| 8,426,813 B2 | | 4/2013 | Furry |
| 8,507,843 B2 | | 8/2013 | Silny et al. |
| 8,548,271 B2 | | 10/2013 | Grimberg |
| 8,559,721 B1 | | 10/2013 | Bartholomew |
| 8,698,939 B2 | | 4/2014 | Rockley |
| 2002/0176054 A1 | | 11/2002 | Mihalakis |
| 2003/0206325 A1 | | 11/2003 | Sachse et al. |
| 2006/0091310 A1 | * | 5/2006 | Furry ..................... G01J 5/061 |
| | | | 250/330 |
| 2008/0024860 A1 | | 1/2008 | Yaroslavsky et al. |
| 2008/0048121 A1 | | 2/2008 | Hinnrichs |
| 2008/0168826 A1 | | 7/2008 | Saidi et al. |
| 2008/0223109 A1 | | 9/2008 | Nitta et al. |
| 2008/0231719 A1 | | 9/2008 | Benson et al. |
| 2009/0159798 A1 | | 6/2009 | Weida et al. |
| 2010/0284570 A1 | * | 11/2010 | Grimberg .............. G01M 3/002 |
| | | | 382/103 |
| 2011/0176048 A1 | * | 7/2011 | Rockley ............. G02B 27/1066 |
| | | | 348/340 |
| 2014/0002667 A1 | | 1/2014 | Cheben et al. |
| 2014/0008526 A1 | | 1/2014 | Zeng et al. |

* cited by examiner

APPARATUS AND METHOD FOR MULTI-SPECTRAL DUAL BALANCED IMAGING

BACKGROUND OF THE INVENTION

1. Field of Invention

This invention relates to imaging and, in particular, to an apparatus and method for multi-spectral dual balanced imaging.

2. Description of Related Art

Multi-spectral imaging systems produce images, such as images of objects and scenes, at more than one band or range of wavelengths of the electromagnetic spectrum. Some multi-spectral imaging systems can produce first and second simultaneously captured images at first and second spectrally distinct ranges of infrared wavelengths, respectively, and can display a differential image representing the difference between the first and second images. Such multi-spectral imaging systems are useable to display a representation of a scene or object, such as a gas plume, that is associated with electromagnetic radiation in the first, but not second, range of infrared wavelengths.

However, such multi-spectral imaging systems produce significant variations in relative intensity between the first and second images at respective pixel coordinates of the first and second images in response to a uniform incident light; produce ghost images due to the Narcissus effect of detecting as incident light electromagnetic radiation produced within the system itself; produce differential images with insufficient contrast between the first and second images, particularly in the absence of a high intensity incident light; are not suitable for imaging while the system undergoes movement; cannot produce differential images having high contrast in the case of wide ranges of infrared wavelengths nor in the case of multiple selectable ranges of infrared wavelengths; cannot produce images suitable for determining a flow rate associated with the gas plume; are too heavy for portable use; and include optical distortions, such as differences in optical path length of the respective optical paths within the system associated with the first and second images, lens aberrations such as barrel and trapezoidal lens aberrations, optical distortions resulting from mechanical vibrations within the system and parallax distortions in the optical paths, that impede pixel registration of the respective pixel coordinates.

In particular, such multi-spectral imaging systems include a pair of detectors that may be calibrated using a two-point Non Uniformity Correction (NUC) type calibration, which involves adjusting gain and offset of pixel elements of each detector to produce uniform output in the presence of uniform incident light associated with two different temperatures. However, such two-point calibration technique cannot calibrate for non-linearity between wavelength and gain and cannot calibrate for non-linearity between wavelength and offset. Thus, such multi-spectral imaging systems are subject to a non-linearity affecting comparisons of the pair of images that cannot be corrected using the two-point NUC type calibration.

SUMMARY

The above shortcomings may be addressed by providing, in accordance with one aspect of the invention, an apparatus for multi-spectral balanced imaging. The apparatus includes: (a) a first member operable to produce from incident light a first band having first band wavelengths and a second band; and (b) a second member operable to produce from the second band a third band having wavelengths shorter than the first band wavelengths, excluding the first band wavelengths and having wavelengths longer than the first band wavelengths.

The apparatus may be operable to produce the third band such that the third band is at least a subset of the second band. The apparatus may be operable to produce the third band such that the third band comprises a short band having wavelengths shorter than the first band wavelengths and a long band having wavelengths longer than the first band wavelengths. The apparatus may be operable to produce the third band such that the average of the intensity of the short band and the intensity of the long band is substantially equal to the intensity of the first band when the incident light is uniform. The apparatus may be operable to detect the first band and the third band such that the detected intensity of the first band is substantially equal to the average of the detected intensity of the short band and the detected intensity of the long band when the incident light is uniform.

The first member may be operable to receive the incident light. The first member may be operable to produce the first band by reflecting electromagnetic radiation of the incident light having the first band wavelengths. The first member may be operable to produce the second band by transmitting therethrough electromagnetic radiation having second band wavelengths. The first member may have a first side and a second side opposite the first side. The first member may be operable to receive the incident light at the first side. The first member may be operable to reflect the first band from the first side. The first member may be operable to transmit the second band from the second side. The first member may be operable to transmit the second band toward the second member. The second member may be operable to receive the second band. The second member may be operable to receive the second band from the first member. The apparatus may be dimensioned such that the second member is positioned to receive the second band transmitted from the first member. The second member may have a reflection side and a transmission side. The second member may be operable to receive the second band at its reflection side. The second member may be operable to reflect the third band from its reflection side. The second member may be positioned to reflect the third band from its reflection side toward the first member. The apparatus may be dimensioned such that the first member is positioned to receive the third band from the second member. The apparatus may be operable to transmit the third band through the first member.

The first member may be a first band reflection filter. The first member may be a first notch filter. The first notch filter may be operable to reflect the first band such that the first band wavelengths are contiguous. The first notch filter may be operable to reflect the first band such that the first band may be a narrow band. The first notch filter may be operable to transmit therethrough the second band such that the second band includes a short wavelength portion having wavelengths shorter than the first band wavelengths and a long wavelength portion having wavelengths longer than the first band wavelengths. The first notch filter may be operable to transmit therethrough the second band such that the second band has the second band wavelengths and excludes the first band wavelengths.

The second member may be a mirror. The mirror may be operable to reflect the third band such that the second and third bands have substantially identical wavelengths.

The second member may be a dichroic filter. The second member may be an edge filter. The edge filter may have associated therewith an edge cutoff wavelength. The edge filter may be a shortpass filter. The shortpass filter may be operable to transmit therethrough electromagnetic radiation having wavelengths shorter than the edge cutoff wavelength. The shortpass filter may be operable to reflect electromagnetic radiation having wavelengths longer than the edge cutoff wavelength. The edge cutoff wavelength may be shorter than the first band wavelengths. The shortpass filter may be operable to reflect the third band such that the third band excludes wavelengths shorter than the edge cutoff wavelength. The edge filter may be a longpass filter. The longpass filter may be operable to transmit therethrough electromagnetic radiation having wavelengths longer than the edge cutoff wavelength. The longpass filter may be operable to reflect electromagnetic radiation having wavelengths shorter than the edge cutoff wavelength. The edge cutoff wavelength may be longer than the first band wavelengths. The longpass filter may be operable to reflect the third band such that the third band excludes wavelengths longer than the edge cutoff wavelength.

The second member may be a second notch filter. The second member may be a second band reflection filter. The second band reflection filter may have associated therewith first and second cutoff wavelengths. The first cutoff wavelength may be a shorter wavelength than the second cutoff wavelength. The second band reflection filter may be operable to reflect the third band such that the third band has wavelengths longer than the first cutoff wavelength and shorter than the first band wavelengths, and has wavelengths longer than the first band wavelengths and shorter than the second cutoff wavelength.

The apparatus may include first and second detectors for producing images. The first detector may be operable to receive the first band. The first detector may be operable to produce a first image by detecting the first band. The first member may be operable to reflect the first band toward the first detector. The apparatus may be dimensioned such that the first member is positioned to reflect the first band toward the first detector. The apparatus may be dimensioned such that the first detector is positioned to receive the first band. The second detector may be operable to receive the third band. The second detector may be operable to produce a second image by detecting the third band. The second member may be operable to reflect the third band toward the second detector. The apparatus may be dimensioned such that the second member is positioned to reflect the third band toward the second detector. The apparatus may be dimensioned such that the second detector is positioned to receive the third band. The apparatus may be dimensioned such that the second detector is positioned to receive the third band after the third band has propagated from the second member to the second detector.

The apparatus may include a lens. The apparatus may be dimensioned such that the lens is positioned between the first and second members and the first and second detectors. The apparatus may include a plurality of lenses. The apparatus may include an entry mirror for redirecting the incident light toward the first member. The entry mirror may be adjustable for adjusting the direction in which the incident light is redirected. The apparatus may be operable to permit the first member notch filter and the second member to rotate in unison, while permitting the entry mirror to rotate in an opposite direction. The apparatus may include a storage memory for storing the images. The apparatus may include a processor for processing the images. The apparatus may include a memory for storing codes for instructing the processor. The storage memory may be operable to store the codes. The apparatus may include a display for displaying the images.

In accordance with another aspect of the invention, there is provided a method of multi-spectral balanced imaging for producing images. The method involves: (a) producing from incident light a first band having first band wavelengths and a second band; and (b) producing from the second band a third band having wavelengths shorter than the first band wavelengths, excluding the first band wavelengths and having wavelengths longer than the first band wavelengths.

Producing from the second band a third band having wavelengths shorter than the first band wavelengths, excluding the first band wavelengths and having wavelengths longer than the first band wavelengths may involve producing at least a subset of the second band. Producing from the second band a third band having wavelengths shorter than the first band wavelengths, excluding the first band wavelengths and having wavelengths longer than the first band wavelengths may involve producing a short band having wavelengths shorter than the first band wavelengths and a long band having wavelengths longer than the first band wavelengths. Producing from the second band a third band having wavelengths shorter than the first band wavelengths, excluding the first band wavelengths and having wavelengths longer than the first band wavelengths may involve producing the third band such that the average of the intensity of the short band and the intensity of the long band is substantially equal to the intensity of the first band when the incident light is uniform. The method may further involve detecting the first band and the third band such that the detected intensity of the first band is substantially equal to the average of the detected intensity of the short band and the detected intensity of the long band when the incident light is uniform.

Producing from incident light a first band having first band wavelengths and a second band may involve receiving the incident light by a first member. Producing from incident light a first band having first band wavelengths and a second band may involve reflecting from the first member electromagnetic radiation of the incident light having the first band wavelengths. Producing from incident light a first band having first band wavelengths and a second band may involve transmitting through the first member electromagnetic radiation having second band wavelengths. Producing from incident light a first band having first band wavelengths and a second band may involve transmitting the second band from the first member toward a second member. Producing from the second band a third band having wavelengths shorter than the first band wavelengths, excluding the first band wavelengths and having wavelengths longer than the first band wavelengths may involve receiving the second band by the second member from the first member. Producing from the second band a third band having wavelengths shorter than the first band wavelengths, excluding the first band wavelengths and having wavelengths longer than the first band wavelengths may involve reflecting the third band from the second member. Producing from the second band a third band having wavelengths shorter than the first band wavelengths, excluding the first band wavelengths and having wavelengths longer than the first band wavelengths may involve reflecting the third band from the second member toward the first member. Producing from the second band a third band having wavelengths shorter than the first band wavelengths, excluding the first band wavelengths and having wavelengths longer than the first band wavelengths may involve receiving the third band by the first member from the second member. Producing from the second band a third band having wavelengths shorter than the first band wavelengths, excluding the first band wavelengths and having wavelengths longer than the first band wavelengths may involve transmitting the third band through the first member.

Producing from incident light a first band having first band wavelengths and a second band may involve producing the first and second bands by a first band reflection filter. Producing from incident light a first band having first band wavelengths and a second band may involve producing the first and second bands by a first notch filter. Producing from incident light a first band having first band wavelengths and a second band may involve producing the first band such that the first band wavelengths are contiguous. Producing from incident light a first band having first band wavelengths and a second band may involve producing a narrow band. Producing from incident light a first band having first band wavelengths and a second band may involve producing the second band such that the second band includes a short wavelength portion having wavelengths shorter than the first band wavelengths and a long wavelength portion having wavelengths longer than the first band wavelengths. Producing from incident light a first band having first band wavelengths and a second band may involve producing the second band such that the second band has the second band wavelengths and excludes the first band wavelengths.

Producing from the second band a third band having wavelengths shorter than the first band wavelengths, excluding the first band wavelengths and having wavelengths longer than the first band wavelengths may involve reflecting the second band by a mirror to produce the third band such that the second and third bands have substantially identical wavelengths.

Producing from the second band a third band having wavelengths shorter than the first band wavelengths, excluding the first band wavelengths and having wavelengths longer than the first band wavelengths may involve producing the third band by an edge filter having associated therewith an edge cutoff wavelength. Producing from the second band a third band having wavelengths shorter than the first band wavelengths, excluding the first band wavelengths and having wavelengths longer than the first band wavelengths may involve producing the third band by a shortpass filter having associated therewith a shortpass cutoff wavelength shorter than the first band wavelengths. Producing from the second band a third band having wavelengths shorter than the first band wavelengths, excluding the first band wavelengths and having wavelengths longer than the first band wavelengths may involve producing the third band by a longpass filter having associated therewith a longpass cutoff wavelength longer than the first band wavelengths.

Producing from the second band a third band having wavelengths shorter than the first band wavelengths, excluding the first band wavelengths and having wavelengths longer than the first band wavelengths may involve producing the third band by a second notch filter. Producing from the second band a third band having wavelengths shorter than the first band wavelengths, excluding the first band wavelengths and having wavelengths longer than the first band wavelengths may involve producing the third band by a second band reflection filter having associated therewith a first cutoff wavelength and a second cutoff wavelength longer than the first cutoff wavelength. Producing from the second band a third band having wavelengths shorter than the first band wavelengths, excluding the first band wavelengths and having wavelengths longer than the first band wavelengths may involve reflecting from the second band reflection filter the third band such that the third band has wavelengths longer than the first cutoff wavelength and shorter than the first band wavelengths, and has wavelengths longer than the first band wavelengths and shorter than the second cutoff wavelength.

Producing from the second band a third band having wavelengths shorter than the first band wavelengths, excluding the first band wavelengths and having wavelengths longer than the first band wavelengths may involve producing the third band by a dichroic filter.

The method may further involve producing images by first and second detectors. Producing images by first and second detectors may involve detecting the first and third bands by the first and second detectors, respectively. Detecting the first and third bands by the first and second detectors, respectively, may involve receiving the first band by the first detector. Receiving the first band by the first detector may involve reflecting the first band toward the first detector. Reflecting the first band toward the first detector may involve guiding the first band through a lens of the apparatus. Detecting the first and third bands by the first and second detectors, respectively, may involve receiving the third band by the second detector. Detecting the first and third bands by the first and second detectors, respectively, may involve receiving the third band by the second detector after propagating the third band from the second member to the second detector. Receiving the third band by the second detector may involve reflecting the third band toward the second detector. Reflecting the third band toward the second detector may involve guiding the third band through the lens. Reflecting the third band toward the second detector may involve guiding the third band through a second lens of the apparatus.

The method may further involve redirecting the incident light by an entry mirror toward the first member. The method may further involve adjusting an angle of the entry mirror. The method may further involve processing the images produced by the first and second detectors. Processing the images produced by the first and second detectors may involve processing by a processor in accordance with codes stored in a memory to produce a first set of images associated with the first detector and a second set of images associated with the second detector. The method may further involve storing the first and second sets of images. The method may further involve displaying the first and second sets of images. Displaying the images may involve simultaneously at least one image of the first set of images and at least one image of the second set of images.

Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention.

DETAILED DESCRIPTION

An apparatus for multi-spectral balanced imaging includes: (a) means for producing from incident light a first band having first band wavelengths and a second band; and (b) means for producing from the second band a third band having wavelengths shorter than the first band wavelengths, excluding the first band wavelengths and having wavelengths longer than the first band wavelengths. For the descriptive purposes herein, reference to a band is reference to electromagnetic radiation having specifiable wavelengths, such as by having wavelengths in a specifiable range of the electromagnetic spectrum; reference to a band having specified wavelengths is reference to a band substantially comprising electromagnetic radiation at the specified wavelengths but possibly also including other electromagnetic radiation at other wavelengths of the electromagnetic spectrum; and reference to a band excluding specified wavelengths is reference to a band for which electromagnetic radiation at the specified wavelengths is attenuated in intensity relative to the intensity of other electromagnetic radiation of the band.

Figure 1:
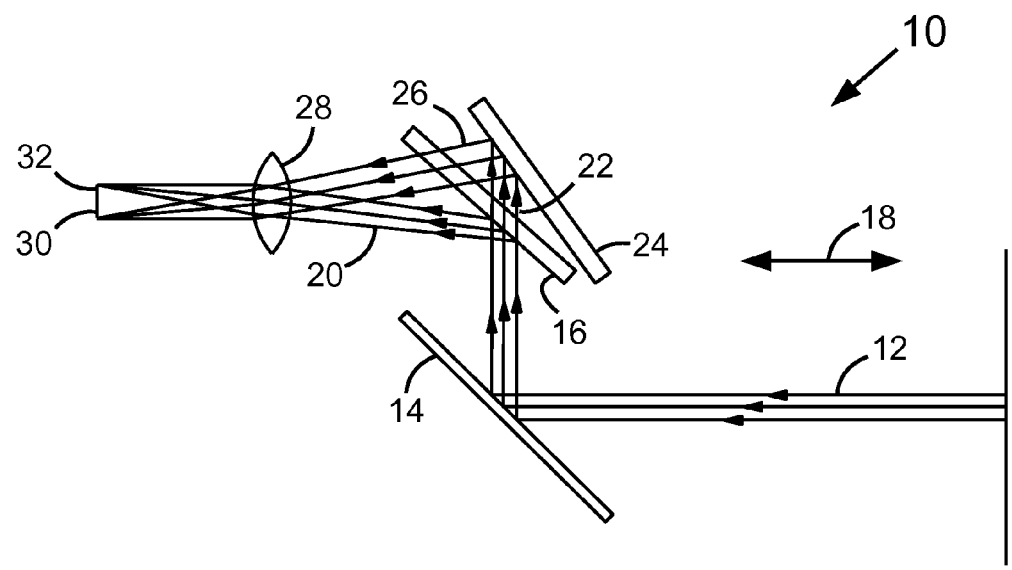
FIG. 1 is a sectional plan view of an apparatus for multi-spectral balanced imaging according to a first embodiment of the invention.

Referring to FIG. 1, the apparatus 10 according to a first and preferred embodiment of the invention is shown. The apparatus 10 is operable to produce a differential image of the difference between a prime beam 20 and a reference beam 26 so as to produce a representation of a scene or object, such as a selectable gas. Incident light 12 enters the fore-optics of the apparatus and is reflected by a mirror 14 toward a notch filter 16. The notch filter 16 may be positioned at 30 to 50 degrees to a longitudinal axis 18 of the apparatus as shown in FIG. 1, for example, including being positioned at 35 degrees. The notch filter 16 partly reflects and partly transmits the reflected incident light. The notch filter 16 reflects electromagnetic radiation of the incident light 12 having wavelengths within a specifiable range associated with the notch filter 16, and transmits the remainder of the incident light 12 through the notch filter 16.

The specifiable range of the notch filter 16 may be specified to correspond to the range of wavelengths known to be associated with a given gas such as methane, propane, butane, ethylene, or other gas, for example. In some embodiments, the notch filter 16 is a narrow band filter reflecting electromagnetic radiation at a small range of wavelengths associated with the given gas. The notch filter 16 renders the apparatus advantageously insensitive to variations in incident angle associated with the incident light 16, and does so to an increasing extent with an increasingly narrow band associated therewith. The electromagnetic radiation reflected from the notch filter 16 forms the prime beam 20.

The electromagnetic radiation transmitted through the notch filter 16 is a transmitted beam 22 directed toward the reflection component 24. The reflection component 24 may be positioned at 30 to 50 degrees to the longitudinal axis 18 of the apparatus, for example, including being positioned at 45 degrees. The reflection component 24 may be positioned at an angle other than the angle of positioning of the notch filter 16, for example. In various embodiments, the reflection component 24 may be a mirror, an edge filter, a shortpass filter, a longpass filter, a band reflection filter, a dichroic filter, or other component operable to reflect at least a subset of the electromagnetic radiation received from the notch filter 16. The electromagnetic radiation reflected from the reflection component 24 forms a reference beam 26 that passes through the notch filter 16 toward a lens 28, which may in at least some embodiments be a lens assembly 28. The reference beam 26 includes electromagnetic radiation having wavelengths shorter and longer than those of the prime beam 20, and excludes the prime beam 20. Embodiments in which the reflection component 24 is an edge filter advantageously have reduced vignetting effects. Additionally or alternatively, vignetting apertures may be suitably employed to enhance the optical operation of the present invention.

The prime beam 20 and the reference beam 26 pass through the lens 28 toward the prime beam detector 30 and the reference beam detector 32, respectively. The prime beam detector 30 and the reference beam detector 32 are operable to detect the prime beam 20 and the reference beam 26 to form a prime image and a reference image, respectively. The apparatus preferably includes a processor (not shown in FIG. 1) operable to produce a differential image representing the difference between the prime image and the reference image. In at least some embodiments, the apparatus includes a display (not shown in FIG. 1) operable to display the differential image, thereby presenting a representation of the gas plume when such gas plume is present in the incident light 12.

Electromagnetic radiation of the reference beam 26 having wavelengths significantly shorter than the wavelengths of the prime beam 20 may be attenuated by the reflection component 24. Additionally or alternatively, the operating bandwidth of the reference beam detector 32 may be suitably employed to limit the detection of such electromagnetic radiation. Similarly, electromagnetic radiation of the reference beam 26 having wavelengths significantly longer than the wavelengths of the prime beam 20 may be attenuated by the reflection component 24. Additionally or alternatively, the operating bandwidth of the reference beam detector 32 may be suitably employed to limit the detection of such significantly long wavelength electromagnetic radiation.

The apparatus in accordance with various embodiments of the present invention are advantageously associated with low manufacturing costs.

The standard technique to correct the response variation across the detector array, such as may be found in a camera for example, is the 2-point calibration such as the 2-point non-uniformity correction (NUC) calibration. The embodiments of the present invention are advantageously suitable for use with the 2-point NUC calibration technique. The focal plane array of an infrared camera consists of matrix of small detectors. For example, the first embodiment may include 320×256 detector elements forming the prime beam detector 30 and the reference beam detector 32. Each detector has its own gain (electrical output per unit of incident infrared power) and offset (output in the absence of input radiation; i.e. the noise level). The purpose of the 2-point NUC is to adjust the gain and offset for each detector to be in line with the average gain and offset for the entire matrix. Without a NUC, a scene consisting of a planar surface ("flag") with a uniform temperature profile would appear as a speckle pattern in the resulting image. After the NUC the image should appear as a featureless, uniformly gray image. If the temperature of the flag were changed, the NUC calibrated matrix would continue to give a featureless, uniformly gray image; only the grayscale value would change. The standard method to perform a NUC is the 2-point calibration with the use of two flags: a cold-flag with temperature approximately equal to 30% of the dynamic range; and hot-flag, about 70% of the dynamic range. The flags are placed in front of the entrance optics in an unfocused area. Assuming linearity between the detector output over the dynamic range, the two parameters, gain and offset, are determined for each detector element with the use of the two measurements (cold and hot signals). If the integration time and optical path associated with a given system are kept the same, then all detector elements are working under the same conditions after the NUC procedure and, thereby, any changes in output from detector pixel to detector pixel can be reliably associated with changes in the scene. The 'acid-test' is: The thermal image obtained from viewing a plane of the same material, with a uniform temperature profile, in the absence of external lighting, should appear featureless and uniformly gray. However, the standard 2-point NUC is not expected to be suitable for prior art multi-spectral imaging systems having a wavelength dependence across the detector array. For example, passing more prime than reference wavelength electromagnetic radiation causes a loss of equality between the respective intensities of the prime image and the reference image. This may result in the prime image being brighter than the reference image. In operation, there may be many dispersive (also known as chromatic) effects which effectively introduce the aforementioned loss of equality on a local scale at parts of the image. Causes of such a relative intensity problem include: The dispersion of the Blackbody curve, wavelength dependence of external lighting, variations in absorptances (both in the air and solid surfaces) with wavelengths, variation in emissivities with wavelength, and shift of filter performance (e.g. peak transmission) with angle of incidence. If the background scene differs in respect of wavelength dependence from a featureless calibration flag of uniform temperature a relative intensity problem may occur. For example: A hot spot may appear brighter in the reference image than in the prime image; whereas, a spot that has more external illumination may appear brighter in the prime image than in the reference image; while a spot that has black pigment rather than a metallic pigment may appear brighter in the prime than in the reference, and so on. Thus, the relative intensity problem can be attributed at least to the wavelength related difference between the prime image and the reference image.

The various embodiments of the present invention are advantageously suitable for 2-point NUC calibration by splitting the reference band 26 into two peaks ("camel-back"): namely, one short band thereof having wavelengths shorter than those of the prime band of the prime beam 20 and one long band thereof having wavelengths longer than those of the prime band 20. This symmetrical arrangement advantageously help eliminate dispersion effects, as the average radiation through the camel-back filtering is effectively the same as that of the mean wavelength (which is the wavelength for the prime peak or prime band). Relative to the prime band, dispersion affects the short band in an opposite direction to its effect on the long band such that the average of the intensity associated with the short band and that associated with the long band produces a stable reference beam despite temperature and emissivity variations. The embodiments of the present invention are advantageously insensitive to variations in temperature and emissivity associated with the incident light 12.

Still referring to FIG. 1 with reference to a specific embodiment, the notch filter 16 strongly reflects infrared radiation in the absorption band for the gas (about 3.2 to 3.4 microns wavelength in the case of methane). Thus, the prime beam 20 is very tightly confined to the absorption band and, thereby, good signal to noise is achieved. In some embodiments, the reflection component 24 is a broadband notch filter than is about twice as wide as the notch filter 16, and having its center substantially coincident with the center of the notch filter 16. Thus, the radiation that is reflected by the reflection component 24 and retransmitted through the notch filter 16 to form the reference beam 26 is camel-back in shape; i.e. two roughly symmetrical peaks, one on each side of the prime peak. This camel-back filtering feature of the present invention advantageously alleviates the relative intensity problem, because the average radiation in the reference beam 26 is substantially the same as that at the mean wavelength, which is the central wavelength of the prime beam 20.

As seen in FIG. 1, surfaces of the apparatus are at very oblique angles; thus, light generated inside the apparatus are advantageously not reflected back toward the detectors 30 and 32; thus, the apparatus advantageously has reduced susceptibility to the Narcissus problem.

In the various embodiments of the present invention, the plume contrast is advantageously enhanced or maximized with the use of a narrow bandwidth in respect of the prime beam 20. For example, the width of the range of wavelengths associated with the prime beam 20 may be equal or nearly equal to that of the given gas absorption band. The various embodiments of the present invention can advantageously be manufactured without the need for excessive constraints on the performance of the notch filter 16.

Some embodiments of the present invention permit the notch filter 16 and/or the reflection component 24 to be substituted, thereby advantageously permitting the apparatus to produce images associated with a variety of different objects associated with different wavelengths. In such embodiments, the notch filter 16 may have a narrow band specific to a particular gas, for example.

Some embodiments of the present invention permit the notch filter 16 and the reflection component 24 to rotate in unison, while rotating the mirror 14 in an opposite direction; thereby changing the angle of incidence for the apparatus without changing the axis for the incident light 12. In such embodiments, the peak wavelengths associated with the notch filter 16 and the reflection component 24 shift up and down as the angle of incidence for the mirror 14 is increased and decreased, respectively.

The various embodiments of the present invention are advantageously operable to produce images suitable for determining a flow rate associated with a gas plume ("leak calibration"). For example, various parameters can be used to develop a leak calibration, including: (a) integrated intensity of the rendered plume; (b) the intensity of light traveling through the plume; and (c) average temperature of the background behind the plume. In some embodiments, the apparatus is operable to process parameters (b) and (c) to confirm whether external sourced lighting is dominant and to determine the intensity of the external sourced lighting. Furthermore, the apparatus of such embodiments is operable to determine from the parameter (a) the absolute absorbance of the gas of interest. The apparatus of such embodiments is operable to present a leak calibration quantity in units of ppm*m (parts per million times path length in metres).

As seen in FIG. 1, the apparatus of at least some embodiments of the present invention has a folded geometry that suitably renders the apparatus compact and light. The apparatus advantageously requires minimal or no cantilevering off the apparatus chassis due to the advantageous feature that components such as the mirror 14, the notch filter 16 and the reflection component 24 can be mounted very close to the lens 28. In a variation of the first embodiment, the mirror 14 is excluded such that the incident light 12 is received directly toward the notch filter 16.

While not necessarily shown in FIG. 1, in a variation of the first embodiment there may be added one or more additional components for enhancing the filtering and optical processing of the apparatus, such as an additional edge filter, passband filter, pass reflection filter or trim filter, may be positioned between the mirror 14 and the notch filter 16, between the notch filter 16 and the reflection component 24, between the notch filter 16 and the lens 28, between the lens 28 and the prime beam detector 30 and/or the reference beam detector 32, or any combination thereof for example.

Figure 2:
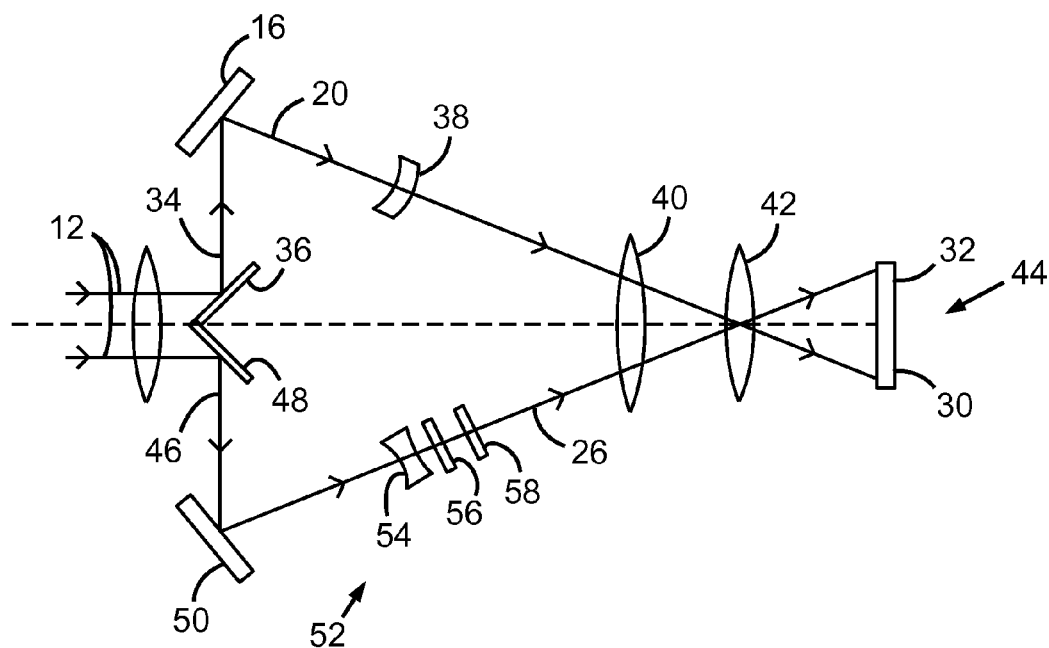
FIG. 2 is a sectional plan view of an apparatus for multi-spectral balanced imaging according to a second embodiment of the invention.

Referring to FIG. 2, the apparatus 10 in accordance with a second embodiment of the invention is shown, in which a first portion 34 of incident light 12 reflected from a first mirror 36 is directed toward the notch filter 16 that reflects a portion thereof as the prime beam 20 through one or more lenses 38, 40 and 42 toward the first detector 30 of a Focal Plane Array (FPA) 44, and a complementary second portion 46 of the incident light 12 reflected from a second mirror 48 is directed toward a reflection component, such as a third mirror 50, that reflects at least a portion thereof toward the second detector 32 of the FPA 44 after being transmitted through an assembly 52 comprising at least one of a lens 54, a notch filter 56 and an edge filter 58. The portion shown in FIG. 2 being transmitted through the assembly 52 may be considered the reference beam 26 (FIG. 1).

Figure 3:
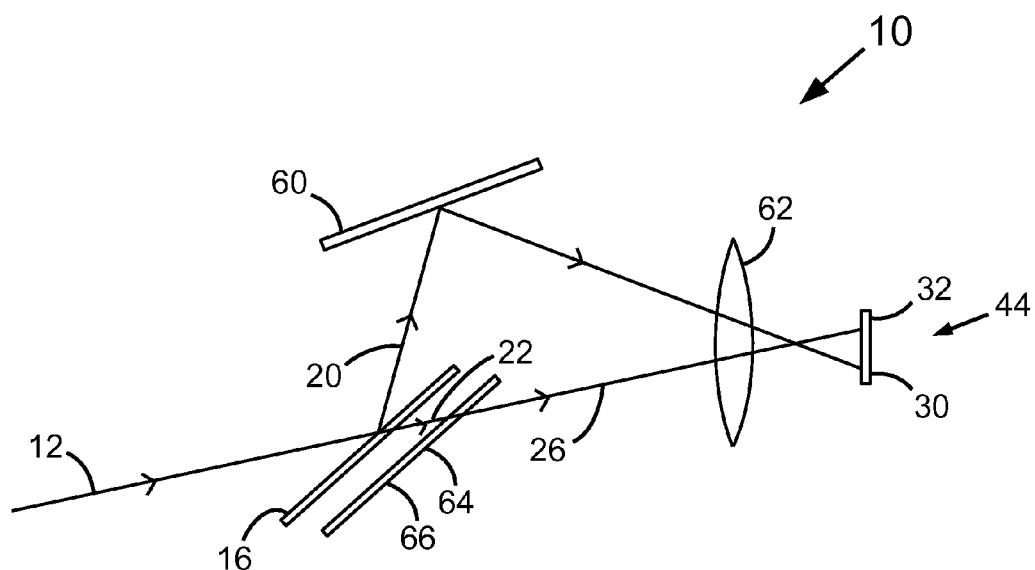
FIG. 3 is a sectional plan view of an apparatus for multi-spectral balanced imaging according to a third embodiment of the invention.

Referring to FIG. 3, the apparatus 10 in accordance with a third embodiment of the invention is shown, in which the portion 20 of the incident light 12 reflected from the notch filter 16 is redirected by a mirror 60 through one or more lenses 62 toward the first detector 30 of the FPA 44, and the portion 22 of the incident light 12 that is transmitted through the notch filter 16 is transmitted through a transmission component 64 such as an edge filter 66 so as to be directed as the reference beam 26 through the one or more lenses 62 toward the second detector 32 of the FPA 44.

Figure 4:
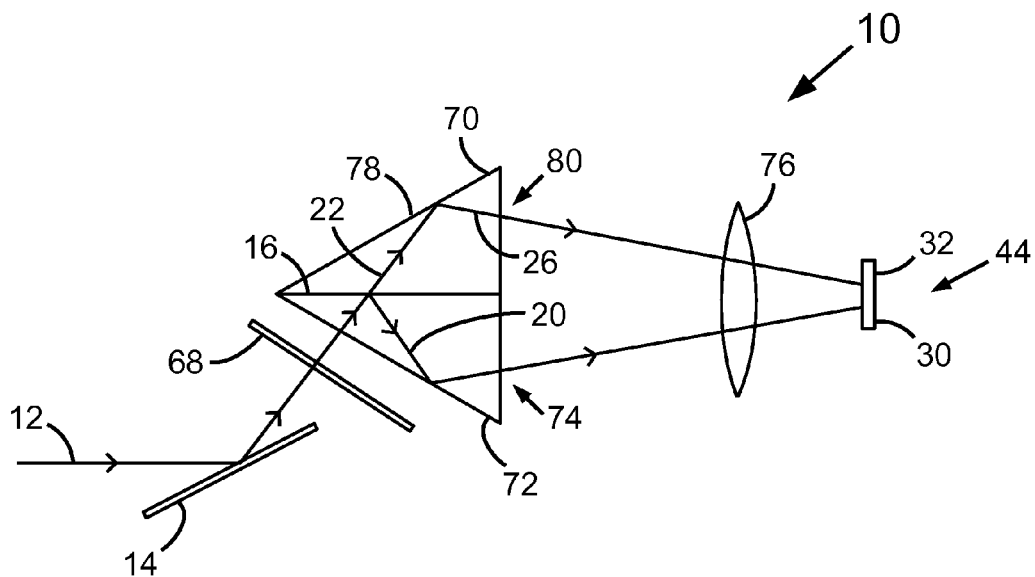
FIG. 4 is a sectional plan view of an apparatus for multi-spectral balanced imaging according to a fourth embodiment of the invention.

Referring to FIG. 4, the apparatus 10 in accordance with a fourth embodiment of the invention is shown, in which incident light 12 is reflected by the mirror 14 toward an edge filter 68 for transmission through the edge filter 68 toward a prism 70 comprising the notch filter 16, such as may be implemented by a coating such as a dichroic coating therein, for reflection of the reflection portion 20 thereof from the notch filter 16 toward a side 72 of the prism 70 for redirection to a first output 74 of the prism 70 toward one or more lenses 76 toward the first detector 30 of the FPA 44, and for transmission of the transmission portion 22 thereof from the notch filter 16 toward an opposing side 78 of the prism 70 for redirection as the reference beam 26 to a second output 80 of the prism 70 toward the one or more lenses 76 toward the second detector 32 of the FPA 44.

Figure 5:
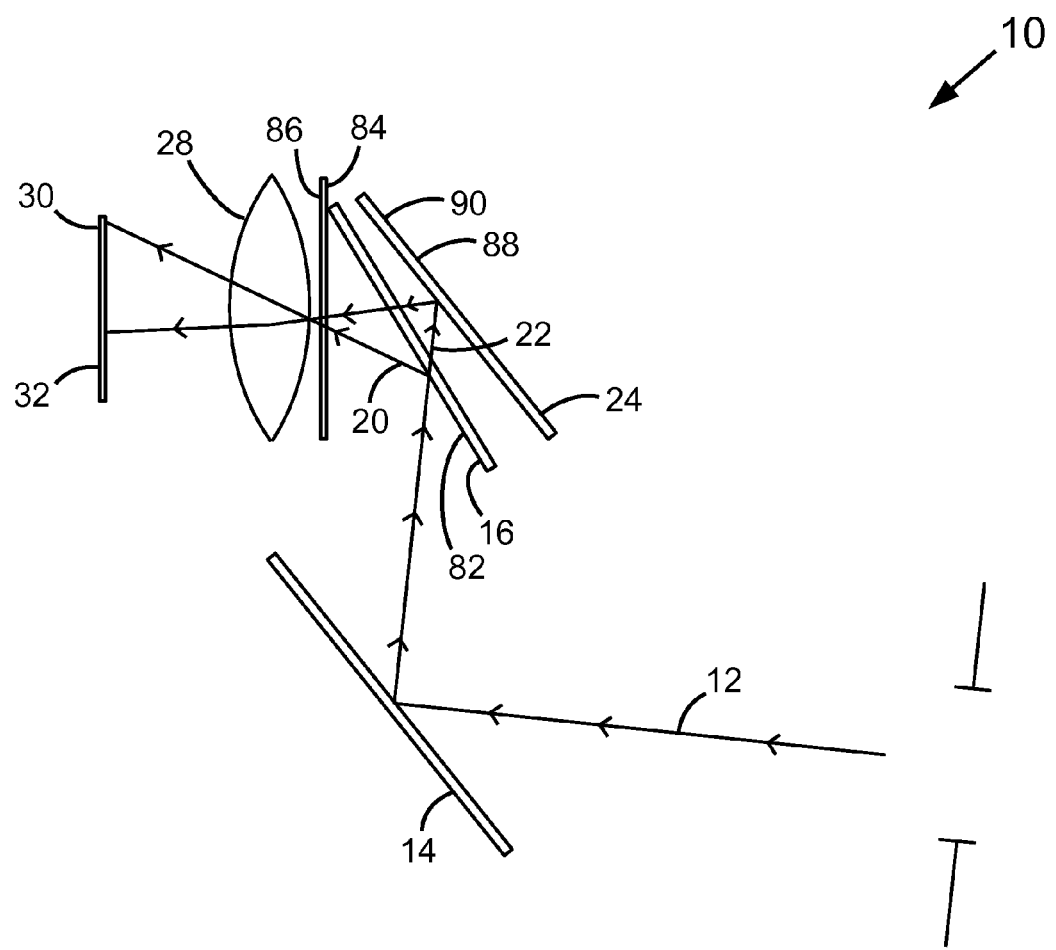
FIG. 5 is a sectional plan view of an apparatus for multi-spectral balanced imaging according to a fifth embodiment of the invention.

Referring to FIG. 5, the apparatus 10 in accordance with a fifth embodiment of the invention is shown, in which incident light is reflected by the optional mirror 14 toward an optical component 16, such as an edge filter 82 which may be implemented as a dichroic splitter, that reflects a portion 20 thereof through one or more optional notch filters 84 and one or more optional trim filters 86 and the one or more lenses 28 toward the first detector 30, and that transmits a portion 22 thereof for reflection from the reflection component 24 such as a narrow band reflector 88 and/or notch filter 90 for retransmission through the optical component 16 and the one or more optional notch filters 84 and one or more optional trim filters 86 and one or more lenses 28 toward a second detector 32.

Figure 6:
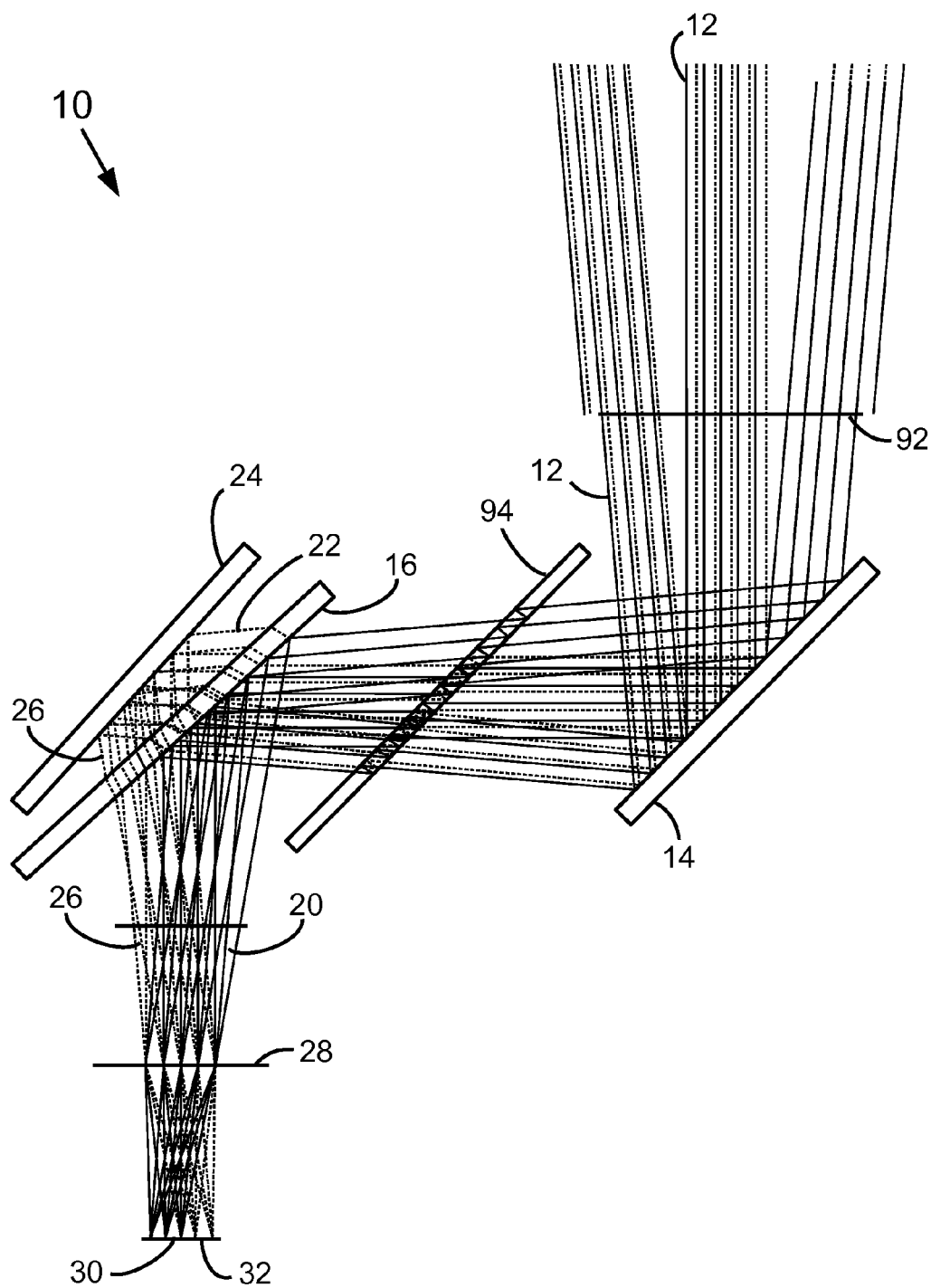
FIG. 6 is a sectional plan view of an apparatus for multi-spectral balanced imaging according to a sixth embodiment of the invention.

Referring to FIG. 6, the apparatus 10 in accordance with a sixth embodiment of the invention is shown, in which incident light 12 passes a field stop 92 toward the first folding mirror 14, is reflected from the first folding mirror 14 toward a first filter 94, passes through the first filter 94 toward the pair of optical elements 16 and 24 disposed nearly parallel to each other, is reflected from the pair of optical elements toward the first lens 28, passes through the first lens 28 toward the one or more IR (Infra-Red) sensors 30 and 32, and is detected by the one or more IR sensors 30 and 32.

Thus, there is provided an apparatus for multi-spectral balanced imaging, the apparatus comprising a first member operable to produce from incident light a first band having first band wavelengths and a second band; and a second member operable to produce from the second band a third band having wavelengths shorter than the first band wavelengths, excluding the first band wavelengths and having wavelengths longer than the first band wavelengths.

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

What is claimed is:

1. An apparatus for multi-spectral balanced imaging, the apparatus comprising:
    (a) a notch filter operable to produce from incident light a first band having first band wavelengths and a second band;
    (b) a band reflection filter positioned to receive said second band from said notch filter, said band reflection filter being operable to produce from said second band a third band having wavelengths shorter than said first band wavelengths, excluding said first band wavelengths and having wavelengths longer than said first band wavelengths, said band reflection filter having its center substantially coinciding with the center of said notch filter;
    (c) a first detector for producing a first image by detecting said first band; and
    (d) a second detector for producing a second image by detecting said third band after said third band has propagated from said band reflection filter through said notch filter to said second detector,
    wherein said notch filter and said band reflection filter are selected such that a first intensity associated with said first band is substantially equal to a second intensity associated with said third band when said incident light is uniform.

2. The apparatus of claim 1 wherein the apparatus is operable to determine from said first and second images a flow rate associated with a gas plume.

3. The apparatus of claim 1 further comprising an entry mirror, the apparatus being operable to permit said notch filter and said band reflection filter to rotate in a first direction and said entry mirror to rotate in a second direction opposite said first direction.

4. An apparatus for multi-spectral balanced imaging, the apparatus comprising:
 (a) a first member operable to produce from incident light a first band having first band wavelengths and a second band;
 (b) a second member positioned to receive said second band from said first member, said second member being operable to produce from said second band a third band having wavelengths shorter than said first band wavelengths, excluding said first band wavelengths and having wavelengths longer than said first band wavelengths;
 (c) a first detector for producing a first image by detecting said first band; and
 (d) a second detector for producing a second image by detecting said third band after said third band has propagated from said second member to said second detector,
 wherein a first intensity associated with said first band is substantially equal to a second intensity associated with said third band when said incident light is uniform, wherein said first member reflects said first band from said first member and transmits said second band through said first member, wherein said second member reflects said third band from said second member toward said first member, wherein said first member receives said third band from said second member and transmits said third band through said first member, wherein said first intensity is associated with said first band when said first band is being detected by said first detector, and wherein said second intensity is associated with said third band when said third band is being detected by said second detector.

5. The apparatus of claim 4 wherein said second member comprises one or more components selected from the group of components consisting of a mirror, an edge filter, a shortpass filter, a longpass filter, a notch filter, a band reflection filter and a dichroic filter.

6. The apparatus of claim 5 wherein said second member comprises a mirror such that said second and third bands have substantially identical wavelengths.

7. The apparatus of claim 6 wherein the apparatus is operable to determine from said first and second images a flow rate associated with a gas plume.

8. The apparatus of claim 4 wherein the apparatus is operable to determine from said first and second images a flow rate associated with a gas plume.

9. The apparatus of claim 4 further comprising an entry mirror, the apparatus being operable to permit said notch filter and said second member to rotate in a first direction and said entry mirror to rotate in a second direction opposite said first direction.

10. A method of producing multi-spectral balanced images, the method comprising:
 (a) producing from incident light by a notch filter a first band having first band wavelengths and a second band;
 (b) receiving by a band reflection filter said second band from said notch filter and producing from said second band by said band reflection filter a third band having wavelengths shorter than said first band wavelengths, excluding said first band wavelengths and having wavelengths longer than said first band wavelengths, said band reflection filter having its center substantially coinciding with the center of said notch filter, said notch filter and said band reflection filter being selected such that a first intensity associated with said first band is substantially equal to a second intensity associated with said third band when said incident light is uniform;
 (c) producing a first image by detecting said first band by a first detector; and
 (d) producing a second image by detecting said third band by a second detector after said third band has propagated from said band reflection filter through said notch filter to said second detector.

11. The method of claim 10 further comprising determining from said first and second images a flow rate associated with a gas plume.

12. The method of claim 10 further comprising permitting said notch filter and said band reflection filter to rotate in unison while permitting an entry mirror associated with said incident light to rotate in an opposite direction.

13. A method of producing multi-spectral balanced images, the method comprising:
 (a) receiving incident light by a first member, producing from said incident light by said first member a first band having first band wavelengths and a second band, reflecting said first band from said first member, and transmitting said second band through said first member;
 (b) receiving by a second member said second band from said first member, producing from said second band by said second member a third band having wavelengths shorter than said first band wavelengths, excluding said first band wavelengths and having wavelengths longer than said first band wavelengths, such that a first intensity associated with said first band is substantially equal to a second intensity associated with said third band when said incident light is uniform;
 (c) reflecting said third band from said second member toward said first member:
 (d) receiving by said first member said third band from said second member, then transmitting said third band through said first member;
 (e) producing a first image by detecting said first band by a first detector; and
 (f) producing a second image by detecting said third band by a second detector after said third band has propagated from said second member to said second detector,
 wherein producing a first image by detecting said first band by a first detector comprises detecting said first intensity, and wherein producing a second image by detecting said third band by a second detector after said third band has propagated from said second member to said second detector comprises detecting said second intensity.

14. The method of claim 13 wherein receiving by a second member said second band from said first member and producing from said second band by said second member a third band having wavelengths shorter than said first band wavelengths, excluding said first band wavelengths and having wavelengths longer than said first band wavelengths comprises producing said third band by one or more components selected from the group of components consisting of a mirror, an edge filter, a shortpass filter, a longpass filter, a notch filter, a band reflection filter and a dichroic filter.

15. The method of claim 14 wherein producing said third band by one or more components selected from the group of components consisting of a mirror, an edge filter, a shortpass filter, a longpass filter, a notch filter, a band reflection filter and a dichroic filter comprises producing said third band by a mirror such that said second and third bands have substantially identical wavelengths.

16. The method of claim 15 further comprising determining from said first and second images a flow rate associated with a gas plume.

17. The method of claim 13 further comprising determining from said first and second images a flow rate associated with a gas plume.

18. The method of claim 13 further comprising permitting said first member and said second member to rotate in unison while permitting an entry mirror associated with said incident light to rotate in an opposite direction.

19. An apparatus for multi-spectral balanced imaging, the apparatus comprising:
   (a) first means for producing from incident light a first band having first band wavelengths and a second band, said first means reflecting said first band from said first member and transmits said second band through said first member;
   (b) second means for receiving said second band from said first member and producing from said second band a third band having wavelengths shorter than said first band wavelengths, excluding said first band wavelengths and having wavelengths longer than said first band wavelengths, said second means reflecting said third band from said second means toward said first means, said first means receiving said third band from said second means and transmitting said third band through said first means;
   (c) first detection means for producing a first image by detecting said first band, said first detection means detecting a first intensity associated with said first band; and
   (d) second detection means for producing a second image by detecting said third band after said third band has propagated from said second means to said second detection means, said second detection means detecting a second intensity associated with said third band,
   wherein said first intensity is substantially equal to said second intensity when said incident light is uniform.

20. The apparatus of claim 19 further comprising means for determining from said first and second images a flow rate associated with a gas plume.

* * * * *